June 17, 1958 R. KAISER 2,839,266
VALVE
Filed June 4, 1956
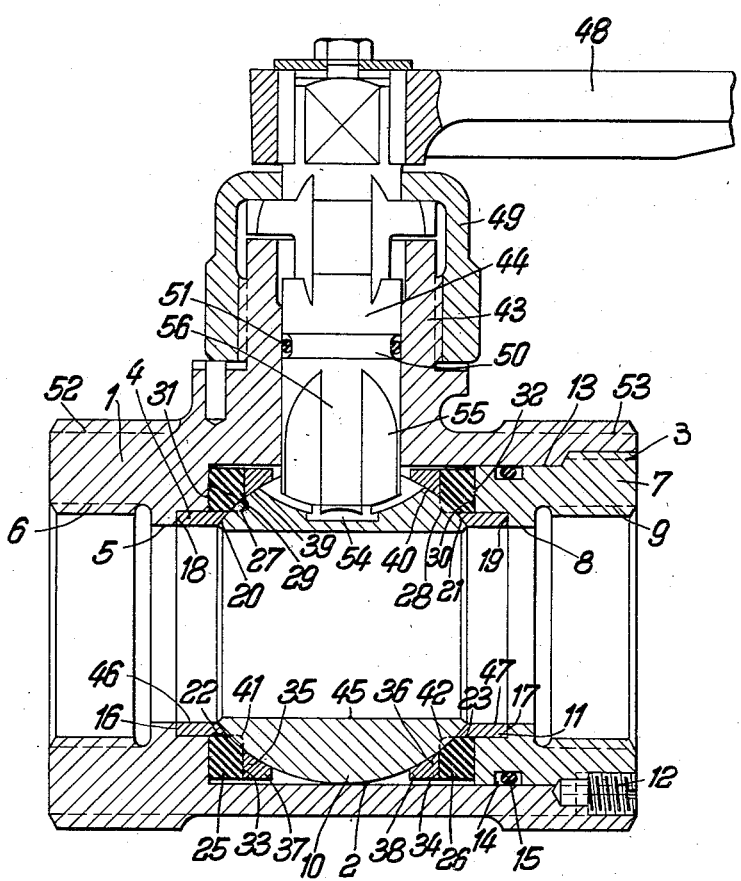
Inventor:
Rudolf Kaiser
by Michael S. Striker
Agent

United States Patent Office 2,839,266
Patented June 17, 1958

2,839,266

VALVE

Rudolf Kaiser, Ettlingen, Baden, Germany

Application June 4, 1956, Serial No. 589,213

Claims priority, application Germany February 3, 1956

3 Claims. (Cl. 251—171)

The present invention relates to valves.

More particularly, the present invention relates to valves of the type which include a turnable substantially spherical valve member which is axially bored and which can be turned through 90° between its open and closed positions.

Valves of this type have certain disadvantages particularly where they are used with a fluid at high pressure and moving at high speeds. Thus, the elements which engage and guide the spherical valve member for turning movement must be tightly pressed against the same where the fluid medium is at a high pressure, and as a result the parts wear very rapidly and the valve does not have a particularly long life. Furthermore, where the fluid medium is in the form of a liquid which carries solid particles therein, the latter particles very often become located between the outer spherical surface of the valve member and the elements which guide the same so that for this reason also the wear on the part is very great and the maintenance of a proper seal is difficult. Also, where such valves include elastic sealing members of rubber or the like, the fluid medium which moves at high speed very often causes such sealing members to be distended in the direction of movement of the fluid medium and to be injured by the movement of the valve member as well as by particles carried in a liquid which passes through the valve, for example.

One of the objects of the present invention is to overcome the above drawbacks by providing a valve of the above type with guide members which are capable of withstanding the wearing forces and which at the same time can be very easily replaced when necessary.

Another object of the present invention is to provide a valve of the above type with elastic sealing rings which cannot become injured in the above described manner.

A further object of the present invention is to provide a valve of the above type with sealing rings which are automatically cleaned by the opening and closing of the valve and which cooperate with the movable valve member in such a way that the latter easily deforms the sealing rings so that the latter press in the desired fashion against the valve member. It is also an object of the present invention to provide structure capable of accomplishing all of the above objects and at the same time composed of simple and ruggedly constructed elements which are very reliable in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the drawing shows a valve arrangement according to the present invention in a sectional elevational view taken along a central vertical plane through the valve of the invention.

Referring to the drawing, it will be seen that the valve of the invention includes a housing means made up of an elongated tubular member 1 formed in its interior with an elongated axial bore portion 2 which at its right end, as viewed in the drawing, is provided with an enlarged threaded inner portion 3. At the left end portion thereof, as viewed in Fig. 1, the tubular member 1 has a bore portion of a smaller diameter than the bore portion 2 and receives a guide ring 4 which has an inner diameter of the same size as the inner diameter of the bore portion 5 of the tubular member 1. To the left of the bore portion 5, the tubular member 1 is provided with a threaded inner bore portion 6 of a larger diameter than the bore portion 5.

A second tubular member 7 forms part of the housing means and is removably fixed within the first tubular member 1, this tubular member 7 threadedly engaging the bore portion 3 of the tubular member 1 and extending to the left beyond the bore portion 3, as shown in the drawing. This second tubular member 7 is provided intermediate its ends with an inner bore portion 8 and to the right of the bore portion 8, as viewed in the drawing, with an inner threaded bore portion 9 of enlarged diameter and to the left of this bore portion 8 with an inner bore portion of enlarged diameter which receives a second guide ring 11. It will be noted that the inner diameter of the guide ring 11 is equal to the diameter of the bore portion 8 of the tubular member 7. The tubular members 1 and 7 cooperate together to urge the guide rings 4 and 11 toward each other and against the outer face of the valve member 10 which is thus located between and guided by the guide rings 4 and 11.

The tubular members 1 and 7 are provided at their lower right portion, as viewed in the drawing, with a threaded bore formed partly in the tubular member 7 and partly in the tubular member 1 and receiving a screw 12 which thus serves to releasably fix the tubular member 7 within the tubular member 1. Furthermore, the tubular member 7 is formed at an outer face portion thereof located to the left of the bore portion 3, as viewed in the drawing, with an annular groove 14 which receives a sealing ring 15. The cylindrical outer surface portion 13 of the tubular member 7 which is formed with the groove 14 is in slidable engagement with the inner face of the tubular member 1 at the bore portion 2 thereof.

The tubular members 1 and 7 form the housing means of the structure of the invention are respectively provided in their interiors with shoulders 16 and 17 directed toward each other, and the end faces 18 and 19 of the guide rings 4 and 11, respectively, are located against the shoulders 16 and 17, respectively. The guide rings 4 and 11 respectively have directed toward each other annular guide faces 20 and 21 which are concave and which respectively form different parts of a sphere of given diameter. The outer face of the valve member 10 which engages the concave guide faces 20 and 21 forms a part of a sphere of this given diameter, so that the guide faces 20 and 21 engage over their entire areas the outer face of the valve member 10. This valve member 10 is located between the rings 4 and 11 when the tubular member 7 is threaded into the tubular member 1, and this tubular member 7 is threaded into the tubular member 1 until the guide rings 4 and 11 press against the valve member 10 with a force required by the maximum operating pressure of the fluid medium which passes through the valve. The guide rings 4 and 11 extend freely into the interior portion of the tubular member 1 where the bore portion 2 is located, and the outer faces 22 and 23 of the guide rings 4 and 11 carry in this interior portion of the tubular member 1 a pair of sealing rings 25 and 26, respectively, these sealing rings being made of a suitable elastic material and being stretchable. The diameters of the outer faces 22 and 23 of the rings 4 and 11 are greater than the inner diameters of the sealing rings 25 and 26 when the latter are unstressed, so that these sealing rings 25 and 26 are tensioned when they are placed on the surfaces 22 and 23, respectively, and thus the sealing rings 25 and 26 press with their own resiliency against the guide rings 4 and 11, respectively. Thus, the inner faces 27 and 28 of the sealing rings 25 and 26 are of a larger diameter when the sealing rings are located on the rings 4 and 11 than when these sealing rings are unstressed. The sealing ring 25 is provided with an annular side face 29 located against an annular surface 31 of the tubular member 1, while the sealing ring 26 is provided with a side face 30 located against the end face 32 of the tubular member 7. As may be seen from the drawing, the sealing rings 25 and 26 are located with clearance within the bore portion 2 of the tubular member 1, so that these sealing rings are unsupported at their outer annular surfaces, and if desired suitable annular clamps may be located against the outer annular surfaces of the rings 25 and 26 to maintain the latter against the rings 4 and 11.

The sealing rings 25 and 26 respectively have inner side faces 33 and 34 directed toward each other, and these inner side faces are respectively engaged by a pair of outer side faces 35 and 36 of a pair of supporting rings 37 and 38 which prevent the sealing rings 25 and 26 from expanding toward each other and which loosely bear against the sealing rings. The supporting rings 37 and 38 are respectively provided with inner concave annular faces 39 and 40 which respectively form additional parts of the sphere of which the faces 20 and 21 of the guide rings 4 and 11 form a part, so that the supporting rings 37 and 38 slidably engage the outer convex face of the valve member 10 and are in this way retained in a position where they loosely engage the inner side faces 33 and 34 of the sealing rings 25 and 26, respectively.

The sealing rings 25 and 26 are of an essentially rectangular cross section. However, they have inner annular edges 41 and 42, respectively, which are convex and rounded, and when the valve member 10 is not located between the guide rings 4 and 11, the edges 41 and 42 of the sealing rings 25 and 26, respectively, expand freely into the space which is occupied by the valve member 10. When the parts are assembled, the outer convex surface of the valve member 10 presses against the sealing rings 25 and 26 and deforms the edges 41 and 42 thereof, respectively, so as to provide a good seal.

The valve member 10 is centered by the rings 4, 11, 25, 26, 37, and 38, and the tubular member 1 is provided with a lateral tubular extension 43 which turnably supports a spindle 44 which is used to turn the valve member 10 from the valve opening position shown in the drawing to a valve closing position where the valve member is turned about a vertical axis through 90° from the position shown in the drawing. In the valve opening position of valve member 10, the bore portion 45 thereof provides an unrestricted flow for the fluid medium. It will be noted that this bore portion 45 is of substantially the same diameter as the interior portions 46 and 47 of the guide rings 4 and 11, and the inner diameters of these guide rings are substantially equal to the diameters of the inner bore portions 5 and 8 of the tubular members 1 and 7, respectively, so that in this way a fluid medium may flow through the valve of the invention with substantially no turbulence.

The spindle 44 is provided with an upper free end portion of non-circular cross section which extends into a similarly shaped opening of a handle 48 which thus may be used to turn the spindle 44 about its axis. A nut 49 is in threaded engagement with the outer face of the lateral tubular extension 43 of the tubular member 1, and this nut 49 is provided with an upper wall formed with a bore through which the spindle 44 freely passes. The spindle 44 is provided with an annular groove 50 which receives a sealing ring 51 so as to provide a sealed slidable engagement between the spindle 44 and the lateral extension 43 of the tubular member 1. The lower face of the upper wall of the nut 49 slidably engages a shoulder of the spindle 44 to retain the latter in its operating position.

The threaded portions 6 and 9 of the tubular members 1 and 7, respectively, are adapted to receive hoses, tubes, or the like for conducting the fluid to and from the valve. Also, the tubular member 1 may be provided adjacent its opposite ends with outer threads 52 and 53 for receiving hoses, tubes, or the like which are operatively connected to the valve for conducting a fluid to and from the same.

Inasmuch as the valve member 10 is centered by the above described rings, the spindle 44 need not perform the function of centering the valve member. The bottom end portion of the spindle 44 extends into a pair of grooves 54 formed in the top portion of the valve member 10 and crossing each other. The outer face of the spindle 44 adjacent its bottom end, as viewed in the drawing, is formed with four axially extending grooves 55 which thus provide between these grooves fins 56 which extend into the crossed grooves 54 so that in this way the valve member 10 is constrained to turn with the spindle 44.

As is apparent from the above description as well as from the drawing, it is a simple matter to disassemble the valve so as to replace the wear resistant metallic rings 4 and 11, when necessary. Furthermore, it will be noted that the supporting rings 37 and 38 engage the sealing rings 25 and 26 so as to prevent the latter from expanding toward each other. Also, during the turning of the valve member 10 between its valve opening and valve closing positions, the inner edges 41 and 42 of the sealing rings 25 and 26 are temporarily free to partly expand into the bore portion 45 of the valve member 10. Because of the rounded convex surfaces of the edges 41 and 42, the valve member 10 very easily rides over these edges and thus, these edges of the sealing ring are cleaned during operation of the valve.

It will be understood that each of the elements described above, or two or more together, may also find a useful application in other types of valves differing from the types described above.

While the invention has been illustrated and described as embodied in high pressure valves, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a valve, in combination, a pair of rigid coaxial guide rings axially spaced from each other and respectively having directed toward each other a pair of annular concave guide faces respectively forming different parts of a sphere of given diameter; a pair of coaxial elastic sealing rings of substantially rectangular cross-section respectively surrounding and engaging said guide rings, respectively extending toward each other beyond said guide faces of said guide rings, and respectively having convex rounded inner annular portions respectively located in their unstressed condition between and beyond said guide faces and extending into the space which would be occupied by a sphere of said given diameter engaging said guide faces; a pair of rigid coaxial supporting rings having a flat annular face normal to the axis thereof and located adjacent to inner side faces of said sealing rings which are directed toward each other for supporting said sealing rings and respectively having inner annular concave faces respectively forming additional parts of said sphere of given diameter; an axially bored valve member having an outer convex face forming part of a sphere of said given diameter and slidably engaging said guide faces of said guide rings and said inner annular faces of said supporting rings, said valve member having a valve opening position where the axis of its bore coincides with the axis of said rings and where said convex rounded inner annular portions of said sealing rings are compressed by and press against the outer face of said valve member, said annular portions of said sealing rings expanding so as to enter partly into said bore during turning of said valve member from said valve opening position thereof to a valve closing position where the axis of said bore is normal to the axis of said rings; and elongated tubular valve housing means including a housing having a bore with an axis coinciding with the axis of said rings, and means for engaging and pressing said guide rings toward each other and against said outer face of said valve member, and for engaging outer side faces of said sealing rings which are directed away from each other to prevent said sealing rings from moving apart from each other and to cause said sealing rings to engage said flat annular faces of the adjacent supporting rings, respectively, and to press the latter resiliently against said spherical valve member.

2. In a valve, in combination, a pair of rigid coaxial guide rings of equal inner diameters axially spaced from each other and respectively having directed toward each other a pair of annular concave guide faces respectively forming different parts of a sphere of given diameter; a pair of coaxial elastic sealing rings of substantially rectangular cross-section respectively surrounding and engaging said guide rings, respectively extending toward each other beyond said guide faces of said guide rings, and respectively having convex rounded inner annular portions respectively located in their unstressed condition between and beyond said guide faces and extending into the space which would be occupied by a sphere of said given diameter engaging said guide faces, said sealing rings having in their unstressed condition inner diameters which are respectively smaller than the outer diameters of said guide rings so that said sealing rings are tensioned and press with their own resiliency against the outer faces of said guide rings; a pair of coaxial rigid supporting rings having a flat annular face normal to the axis thereof and located adjacent to inner side faces of said sealing rings which are directed toward each other for supporting said sealing rings and respectively having inner annular concave faces respectively forming additional parts of said sphere of given diameter; an axially bored valve member having an outer convex face forming part of a sphere of said given diameter and slidably engaging said guide faces of said guide rings and said inner annular faces of said supporting rings, said valve member having a valve opening position where the axis of its bore coincides with the axis of said rings and where said convex rounded inner annular portions of said sealing rings are compressed by and press against the outer face of said valve member, said annular portions of said sealing rings expanding so as to enter partly into said bore during turning of said valve member from said valve opening position thereof to a valve closing position where the axis of said bore is normal to the axis of said rings; and elongated tubular valve housing means including a housing having a bore with an axis coinciding with the axis of said rings, and means for engaging and pressing said guide rings toward each other and against said outer face of said valve member, and for engaging outer side faces of said sealing rings which are directed away from each other to prevent said sealing rings from moving apart from each other and to cause said sealing rings to engage said flat annular faces of the adjacent supporting rings, respectively, and to press the latter resiliently against said spherical valve member.

3. In a valve, in combination, a pair of rigid coaxial guide rings of equal inner diameters axially spaced from each other and respectively having directed toward each other a pair of annular concave guide faces respectively forming different parts of a sphere of given diameter, said guide rings being made of a wear resistant metal; a pair of coaxial elastic sealing rings of substantially rectangular cross-section respectively surrounding and engaging said guide rings, respectively extending toward each other beyond said guide faces of said guide rings, and respectively having convex rounded inner annular portions respectively located in their unstressed condition between and beyond said guide faces and extending into the space which would be occupied by a sphere of said given diameter engaging said guide faces, said sealing rings having in their unstressed condition inner diameters which are respectively smaller than the outer diameters of said guide rings so that said sealing rings are tensioned and press with their own resiliency against the outer faces of said guide rings; a pair of coaxial rigid supporting rings having a flat annular face normal to the axis thereof and adjacent to inner side faces of said sealing rings which are directed toward each other for supporting said sealing rings and respectively having inner annular concave faces respectively forming additional parts of said sphere of given diameter; an axially bored valve member having an outer convex face forming part of a sphere of said given diameter and slidably engaging said guide faces of said guide rings and said inner annular faces of said supporting rings, said valve member having a valve opening position where the axis of its bore coincides with the axis of said rings and where said convex rounded inner annular portions of said sealing rings are compressed by and press against the outer face of said valve member, said annular portions of said sealing rings expanding so as to enter partly into said bore during turning of said valve member from said valve opening position thereof to a valve closing position where the axis of said bore is normal to the axis of said rings; and elongated tubular valve housing means including a housing having a bore with an axis coinciding with the axis of said rings, and means for engaging and pressing said guide rings toward each other and against said outer face of said valve member, and for engaging outer side faces of said sealing rings which are directed away from each other to prevent said sealing rings from moving apart from each other and to cause said sealing rings to engage said flat annular faces of the adjacent supporting rings, respectively, and to press the latter resiliently against said spherical valve member.

References Cited in the file of this patent

UNITED STATES PATENTS

| | | |
|---|---|---|
| 2,533,931 | Hartley | Dec. 12, 1950 |
| 2,762,601 | Clade | Sept. 11, 1956 |